June 6, 1933.                C. L. BRICKMAN                1,913,330
              METHOD OF OBTAINING TREADS CONSISTING OF
              TWO DIFFERENT KINDS OF RUBBER COMPOUND
                        Filed Sept. 10, 1930
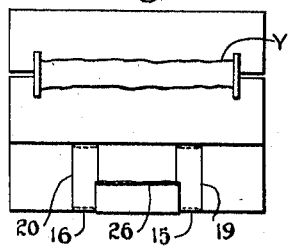
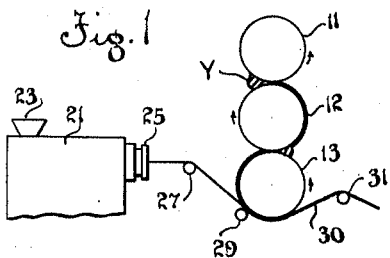
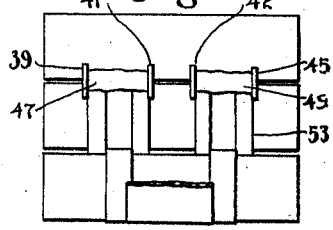
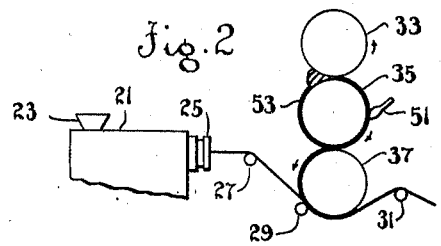
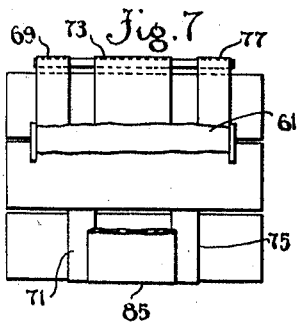
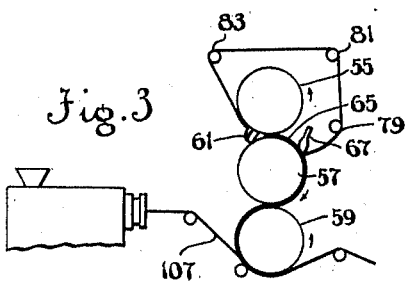
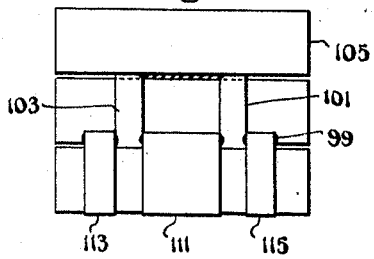
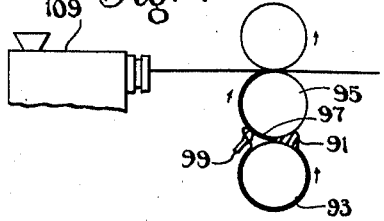
Inventor
Carl Lewis Brickman
By
Attorneys Patented June 6, 1933

1,913,330

UNITED STATES PATENT OFFICE

CARL L. BRICKMAN, OF AKRON, OHIO, ASSIGNOR TO THE GOODYEAR TIRE & RUBBER COMPANY, OF AKRON, OHIO, A CORPORATION OF OHIO

METHOD OF OBTAINING TREADS CONSISTING OF TWO DIFFERENT KINDS OF RUBBER COMPOUND

Application filed September 10, 1930. Serial No. 480,904.

This invention relates to the manufacture of pneumatic tires and it has particular relation to the manufacture of tread units for such tires.

The object of the invention is to provide a highly economical method of manufacturing tread units for pneumatic tires comprising a central tread zone of one type of compound and side-walls of a different compound.

In the manufacture of pneumatic vehicle tires, it is customary to cover a fabric carcass with a relatively thick heavy coating of rubber compound which is adapted to form a protective wear resistant coating for the fabric.

According to general practice, these rubber coverings were calendered out as long continuous strips of rubber material consisting of a single type of compound. The strips were then cut into pieces of convenient length for application to the tires and the units, termed "tread units," so formed were then stitched in any convenient manner about the tire carcasses. The principal disadvantage of such method of manufacturing tread units consisted in the fact that, of necessity, only a single type of compound could be calendered. Therefore, the central or road contacting portion of the unit was formed of identically the same type of material as the side wall portions. This manifestly was undesirable because the central portion of the unit should be formed from a relatively stiff strong material adapted to withstand scuffing and abrasion while the sidewall portions, which are not exposed to appreciable abrasion, preferably should be formed of a different type of compounding adapted to withstand great flexure.

In order to manufacture a tread unit in which an abrasion resistant central or tread zone was combined with highly flexible sidewall portions, it has heretofore been proposed to calender out long strips of compounds having the desired properties. A strip of abrasion resistant material was then united with two sidewall portions of flexible compound by manual methods. Such methods obviously were relatively slow and expensive.

This invention resides in the provision of a method and a mechanism whereby a central tread portion and sidewall portions are simultaneously formed from two distinct types of compound and are then united by mechanical means, thus obviating the manual labor usually attendant to the assembly of tread units including more than a single compound in their construction.

For a better understanding of the invention, reference may now be had to the accompanying drawing, forming a part of the specification in which:

Figs. 1, 2, 3 and 4 are respectively diagrammatical views of four forms of the invention; and Figs. 5, 6, 7 and 8 are diagrammatical views of calender units associated with the mechanisms disclosed in the respective Figs. 1, 2, 3 and 4.

In the embodiment of the invention disclosed in Figs. 1 and 5, a set of calender rolls 11, 12 and 13 is provided. As best shown in Fig. 5, the latter of these rolls is formed with a pair of spaced grooves or channels 15 and 16 which, in combination with the rollers 11, 12 and 13, function to form a pair of endless strips 19 and 20 of side wall material.

For purposes of supplying a strip of tread material, a tubing machine 21 is provided. This machine, which is of conventional design, includes a hopper portion 23, through which compound may be introduced to the machine. The material is forced out of the machine through a convenient die 25, in the form of an elongated strip and is conducted into contact at its marginal portion with the corresponding margins of the strips 19 and 20 by means of guide rollers 27 and 29, the latter of which also functions to stitch this central portion to the margins of the sidewall portions. The assembled unit 30 is conducted away from the mechanism by means of a convenient roller 31. The tread stock material thus formed may be cut into units of desired length and assembled into the tires in any convenient manner. Since the latter steps do not constitute a portion of the invention, they will not be described in detail.

In the manufacture of tread units, a bank of sidewall material is formed as indicated at y between the rollers 11 and 12. The sheet of compound as it is formed is then conducted about the roller 12 downwardly between the latter roller and the grooved roller 13, thereby forming two relatively narrow strips of sidewall material in the grooves 19 and 20. Simultaneously compound is fed into the tubing machine 21 and the midportion 26 of the tread stock is transmitted from the die 25 and over the rollers 27 and 29 in such manner that the margins thereof are brought into contact with the two sidewall portions thus forming a single unit composed of two distinct types of compound.

In the embodiment of the invention disclosed in Figs. 2 and 6, a set of three calender rollers 33, 35 and 37, corresponding to the rollers 11, 12 and 13 is provided. Unlike the construction disclosed in Figs. 1 and 5, the roller 37 is cylindrical in contour throughout its length. In order to form spaced strips of sidewall material, suitable spaced plates 39, 41, 43 and 45 are disposed in the bite of the rollers 33 and 35, in such manner as to confine two small banks 47 and 49 of compound in spaced relation with respect to each other. The strips of compound, as they emerge from between the rollers 33 and 35, are trained about the latter roller and are conducted under suitable trimming knives 51 which serve to cut the strips to proper width. The portions 53 of compound trimmed from the margins of the strips are then trained upwardly about the roller 35 and are returned to the banks 47 and 49. The intermediate or tread portion of the units is supplied to the space between the sidewall portions by means of a tubing unit identical in construction with that disclosed in Fig. 1. Since the constructions are duplicated, the same reference numerals are employed in both instances.

In the embodiment of the invention disclosed in Figs. 3 and 7, a set of calender rollers 55, 57 and 59, substantially similar to the rollers 33, 35 and 37 is provided. However, in this construction, the spacing plates 39, 41, 43 and 45 are omitted thereby permitting the compound to form a bank 61 extending substantially the full length of the rollers. In order to form the narrow strips of sidewall material, the broad sheet 65 of material emerging from between the rollers 55 and 57 is trained about the roller 57 and conducted under knives 67, which serve to split it into a plurality of strips 69, 71, 73, 75 and 77. The strips 69, 73 and 77 are removed from the roller 57 and conducted upwardly about guide rollers 79 and 81 and then inwardly and downwardly about a guide roller 83 to the bank 61. The spaced strips 71 and 75 remaining upon the roller 57 are conducted between the latter roller and the roller 59, and are then trained downwardly about the latter roller into contact with a strip 85 of material constituting the tread zone of the stock. This stock is also supplied by means of a convenient tubing unit and guide rollers corresponding to those described in connection with Fig. 1.

According to the form of the invention disclosed in Figs. 4 and 8, a bank of gum 91 is fed between a pair of rollers 93 and 95. A thin sheet 97 of compound emerging from between these two rollers is trained upwardly about the roller 95 and passes under a set of trimming knives 99 similar to the knives 51 and 67 which are so spaced as to form sidewall strips 101 and 103, which pass upwardly between the roller 97 and a top roller 105. The latter serves to press the marginal portions of the strips into contact with the corresponding margins of a central tread strip 107 from an extruding machine 109 identical in construction with the extruding machine employed in connection with the forms of the invention disclosed in Figs. 1, 2 and 3.

The central portion 111 and the marginal portions 113 and 115 from the sheet 97 are withdrawn from the drum or the roller 95 and are trained downwardly about the roller 93 and are so returned to the bank of compound 91. By the use of any of the forms of the invention disclosed, a tread unit comprising a central portion of tough, abrasion resistant compound and marginal portions of highly flexible heat diffusing compound may readily be formed. The splicing of the sidewall portions to the central portion is accomplished simultaneously with the formation of the component strips of material. The entire operation of manufacturing the tread stock is thus completed in a single operation and without the intervention of manual labor.

Although but the preferred forms of the invention have been illustrated and described in detail, it will be apparent to those skilled in the art that the invention is not so limited but that various modifications may be made therein without departing from the spirit of the invention or from the scope of the appended claims.

What I claim is:

1. A method of manufacturing tread elements for pneumatic tires which comprises forming spaced sidewall strips of a given material upon a profile calender roller and subsequently conducting an interconnecting central strip of a different material into contact with the adjacent margins of the sidewall strips whereby to form a complete tread element.

2. A method of manufacturing tread elements for pneumatic tires which comprises forming spaced sidewall strips of one compound by means of a plurality of calender rollers, one of which is a profile roller, extruding a central interconnecting strip of a different compound, and bringing the marginal portions of the latter into contact with the adjacent margins of the strips upon the profile roller to form a complete tread element.

3. A method of manufacturing tread elements for pneumatic tires which comprises forming two banks of rubber compound between a pair of calender rollers, conducting the strips of material passing from between the calender rollers about one of the rollers, trimming the marginal portions of the strips to a desired width and bringing the adjacent edges of the strips into contact with a central interconnecting strip of a different compound upon one of the rollers.

4. A method of manufacturing tread elements for pneumatic tires which comprises forming a broad sheet of rubber compound by means of calender rolls, splitting the sheet into at least three strips, removing the portion of the sheet between two of the strips and subsequently supplying a connecting strip of a different type of compound in the space between the two strips.

5. A method of forming tread elements for pneumatic tires which comprises calendering a relatively broad sheet of compound by means of a pair of calender rollers, splitting the sheet as it emerges from between the rollers into at least three narrow strips, removing the connecting strip from between two of the strips and returning it to the bank of compound between the rollers, subsequently conducting the remaining strips about one of the rollers and bringing the adjacent marginal portions thereto into contact with the marginal portions of a central connecting strip of compound of different type.

6. A method of manufacturing tread elements for pneumatic tires which comprises forming spaced sidewall strips of one compound by means of a plurality of calender rollers, extruding a central interconnecting strip of a different compound and bringing the marginal portions of the latter into contact with the adjacent margins of the strips upon one of the rollers to form a complete tread element.

7. A method of forming tread elements for pneumatic tires which comprises calendering a relatively broad sheet of compound by means of calender rollers, splitting the sheet as it emerges from between the rollers into at least three narrow strips, removing the connecting strip from between two of the strips and returning it to the bank of compound between the rollers, subsequently conducting the remaining strips about one of the rollers and bringing the adjacent marginal portions thereof into contact with the marginal portions of a central connecting strip of compound of different type.

In witness whereof, I have hereunto signed my name.

Signed at Akron, in the county of Summit and State of Ohio, U. S. A., this 9th day of September, 1930.

CARL L. BRICKMAN.